Figure 1:
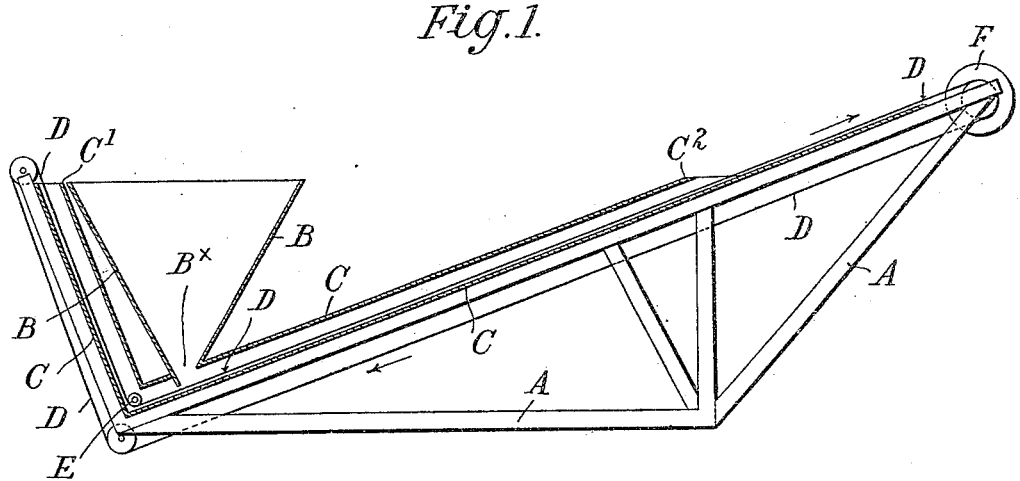

H. G. NICHOLS.
PROCESS OF SEPARATING LIQUIDS FROM SOLIDS.
APPLICATION FILED APR. 3, 1908.

958,272.

Patented May 17, 1910.
2 SHEETS—SHEET 1.

WITNESSES:
Fannie Fisk
Henry J. Suhrbier

INVENTOR
Horace George Nichols
BY
Gruell & Goepel
ATTORNEYS.

H. G. NICHOLS.
PROCESS OF SEPARATING LIQUIDS FROM SOLIDS.
APPLICATION FILED APR. 3, 1908.
958,272.
Patented May 17, 1910.
2 SHEETS—SHEET 2.
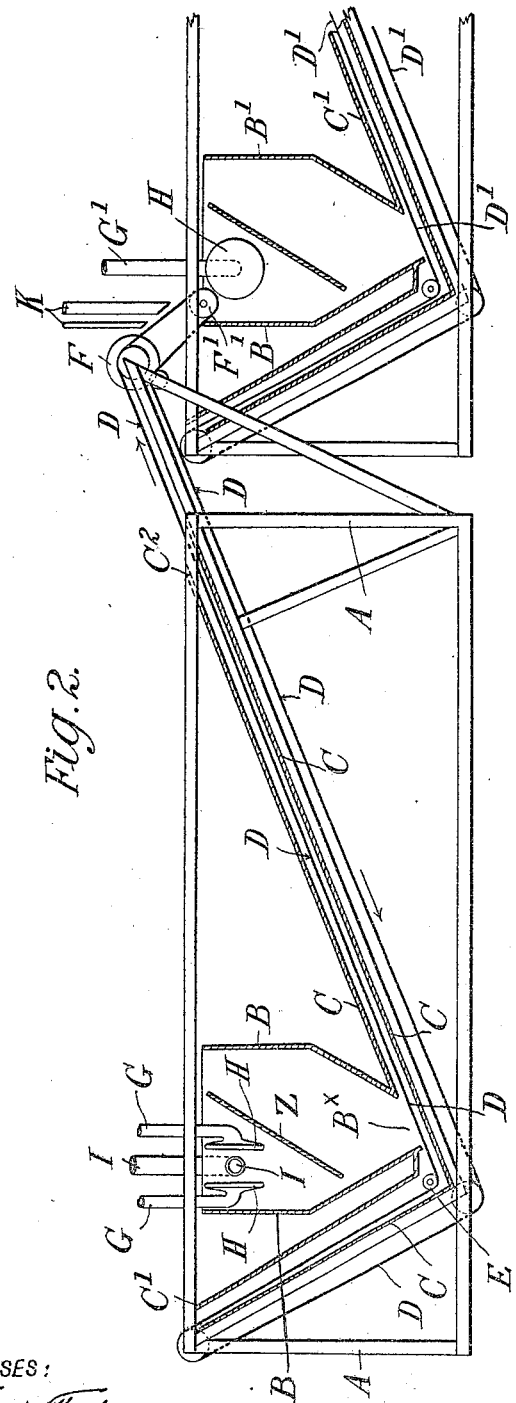
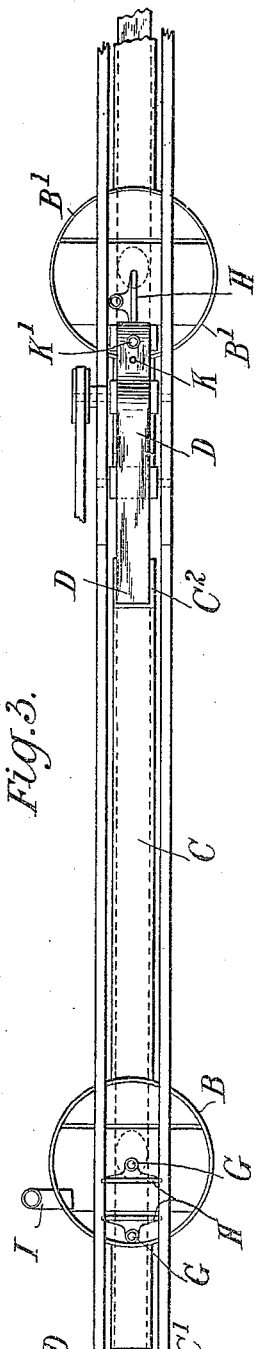

of the liquid and solid components of wet
UNITED STATES PATENT OFFICE.

HORACE GEORGE NICHOLS, OF NEAR YMIR, BRITISH COLUMBIA, CANADA.

PROCESS OF SEPARATING LIQUIDS FROM SOLIDS.

958,272.

Specification of Letters Patent. Patented May 17, 1910.

Application filed April 3, 1908. Serial No. 425,068.

*To all whom it may concern:*

Be it known that I, HORACE GEORGE NICHOLS, engineer, a subject of the King of Great Britain, residing at the Ymir Gold Mines Limited, near Ymir, British Columbia, Dominion of Canada, have invented new and useful Improvements in Processes of Separating Liquids from Solids, of which the following is a specification.

This invention relates to the separation of the liquid and solid components of wet slimes or ore pulp or the like; and primarily is designed to provide a simple, inexpensive and rapid method and means by which the wet slimes or sand and slimes (from which the valuable contents have been extracted by the well-known or any suitable cyanid process from gold and silver ores, etc.) may be separated from the (valuable) cyanid solution, or generally this invention may be employed for extracting the solid contents from mill tailings or any ore pulp to which same may be applicable.

Furthermore the present invention has for its object (*inter alia*) to assist or cause or enable the rapid settlement of the solid matter in suspension in a fluid mass (*e. g.* the finely ground material from ore pulp) by steadily and continuously withdrawing said solid matter, as it settles; such settled solid matter being withdrawn—as it settles— from or near the deepest part of a settling tank or other vessel (or a compartment therein) into which the fluid mass is introduced; and by introducing the wet slimes or ore pulp into said vessel, etc., and by withdrawing the clear solution in such a manner or in such wise as to cause as little disturbance as possible to the whole fluid mass in said tank vessel or compartment and thereby interfere as little as possible with the settling action taking place in said tank vessel or compartment.

Now according to the present invention I cause or permit the solid matter to settle in such settling tank or vessel (or special settling compartment therein) and, as it settles, withdraw such settled solid matter continuously and steadily from the lower part of such tank or vessel or compartment by means of an endless traveling belt which is caused to move in close proximity to the bottom of said settling tank or vessel or settling compartment or in close proximity to the point of discharge of said settled matter from the said settling vessel or compartment onto the belt; and this belt brings the deposited solid matter to the exterior of the said settling tank or vessel etc. and there discharges same. This said belt, as the solid matter is deposited thereon, passes in an upward direction so as to bring the solid matter on said belt to a point above the top level of the fluid mass; and the solid matter, thus withdrawn from the fluid mass, can then be removed from the belt (before the latter returns into the tank or vessel or under the compartment aforesaid) and thereafter this solid matter can either be subjected to a washing operation (as hereinafter described) or otherwise disposed of in any desired manner.

Heretofore in apparatus (such as is known in the gold mining industry as slime separators) for separating solid from the liquid components of wet slimes, and also in apparatus for separating parts of the constituents of ores and other solid bodies from the remainder thereof it has been proposed to employ a tank with an endless conveyer-belt therein adapted to carry out of the tank any solid matter deposited thereon, said conveyer-belt being caused to travel in an upward direction and thereby carry the solid matter deposited thereon out of the tank; and furthermore in such known apparatus it has been proposed to guide such endless conveyer-belt over the inside and outside of the tank and to cause same to travel around in a continuous manner, and at or near the point where such belt emerges from the tank it has been proposed to deliver the ore pulp upon the belt where it is traveling outwardly and just before it emerges from the tank, with the result that although some of the solid matter might thus be separated and carried off by the belt nevertheless this proposed method would not and could not admit of settling action taking place as in the present invention as the proposed former process above referred to lacks the essential conditions to permit the necessary settling action to take place.

In carrying out the present invention the supply of wet slimes or ore pulp is advantageously introduced into the settling tank chamber or compartment as closely as possible or in close proximity to the filtering surface or surfaces of a suction filtering device adapted, by applying thereto alternate suction and pressure, alternately to draw off the clear liquid and to force the solids, which have been collected (during suction) on the filtering surfaces, off the latter; the wet slimes or ore pulp being introduced into the settling tank chamber or compartment and the various parts of the apparatus being arranged and devised in suchwise as to avoid as much as possible the setting up of currents or circulation or otherwise disturbing the fluid mass in said settling tank chamber or compartment.

The settling tank-chamber or compartment may either be a separate tank or other vessel advantageously having an upwardly and outwardly sloping bottom and having an opening in the lowermost part of such settling chamber or compartment through which opening the settled solid matter is deposited on the conveyer-belt as it travels past said bottom opening; and this separate settling tank or vessel may be located within and immersed in the deepest part of a tank with sloping bottom along which latter said conveyer-belt travels; or said separate settling tank or vessel may be connected direct with a trunk or conduit or passage-way within which the said conveyer-belt travels; or in place of a separate tank or vessel as aforesaid the main tank (which may have an upwardly sloping bottom as aforesaid) may be provided with a partition (or partitions) arranged vertically or otherwise therein so as to provide a settling chamber or compartment (or compartments) in the deepest or deep end or part of the main tank to which the ore pulp supply etc. is introduced.

I will now proceed to fully described my present invention—with reference to the drawings hereunto annexed—as carried into practice for the separation of the solid components and liquid components or ore pulp or wet slimes.

Figure 4:
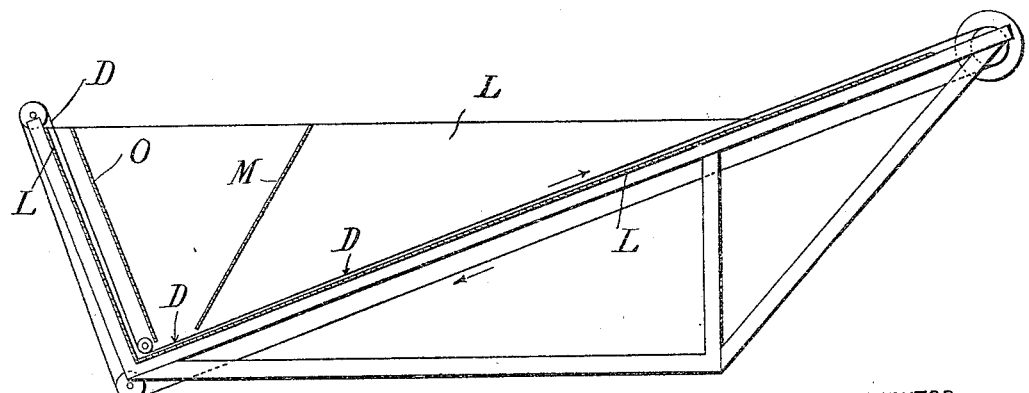

Referring to the accompanying drawings:—Figure 1 is a diagrammatic side elevation—partly in section—of one form of apparatus according to my present invention. Fig. 2 is a similar view of a similar apparatus but showing the arrangement of a plurality of such apparatus for use in succession, and also showing the means for introducing the ore pulp or wet slimes and withdrawing clear liquid; and Fig. 3 is a plan view of Fig. 2. Fig. 4 is a similar view to Fig. 1, but showing a modified construction.

Referring to Figs. 1 to 3: In a suitable framework or support A, I mount a settling tank or vessel B which may for example be of circular form in cross-section at the upper part thereof see Fig. 3, (either of conical form—as in Fig. 1,—or formed with a conical or downwardly converging lower part or bottom see Fig. 2) and having an opening $B^x$ in the bottom part thereof in communication with the trunk C in which travels the endless conveyer belt D; this trunk C at the upper end commences at a point $C^1$ above the highest level attained by the liquid in the settling tank, and from this uppermost point $C^1$ the trunk descends to its lowermost point near the bottom opening of said settling chamber (at which lowermost point a roller E is provided for said conveyer-belt D to pass around) and from this point the trunk C rises upwardly at a suitable incline (say from 20° to 25° from the horizontal) again to a point $C^2$ above the normal level of the liquid in the settling tank; and the conveyer-belt D which passes through this trunk C emerges at the termination $C^2$ of this trunk C and extends to a still higher point, and then passes over one or more rollers F, $F^1$ and then returns exteriorly of the trunk C and tank B to the point where it enters same again, and is guided (both on the outside and inside of the trunk) by any suitable rollers and driven by any suitable means.

The wet ore pulp (or slimes, etc.) is introduced near the upper part of the settling chamber over the deepest point of immersion of the belt; and I arrange means to withdraw the clear solution from said settling chamber and such withdrawing means are advantageously located as close as possible to the point of admission of the ore pulp supply therein. These withdrawing means consist of a suction pipe or pipes G terminating in a suction box or frame or device (such as the nozzle H) of suitable area, each of which suction devices (such as H) is covered or provided with a screen or other suitable filtering means for example textile material such as is at present employed in vacuum filters for slimes; and the arrangement is such as—and means are provided—to prevent the solid matter thickly caking or forming a thick cake on said filter surface of these nozzles H namely this may be prevented by stopping the suction and applying pressure (air or water) through the nozzles H to thereby blow off the cake or solid matter deposited on said nozzles H.

In the arrangement illustrated in Figs. 2 and 3, I have shown two separate suction pipes G with nozzles H, the filtering surface of each of which latter is arranged in a vertical plane and oppositely disposed to one another and located on opposite sides of and close to the point of admission of the wet ore pulp supply through the pipe I, the outlet from which latter may advantageously be below the surface of the liquid in the settling chamber or compartment B. Or the suction device or devices may be disposed in any other suitable position; as for example I may employ one (or more than one) large suction device (not shown) with very large filtering surface thereon disposed in a horizontal plane and directed downward in the settling chamber. Thus as the wet ore pulp or slimes solution, etc., is supplied to the first settling chamber or compartment B in Figs. 2 and 3, the clear liquid (cyanid solution containing the values) is drawn off through said suction device or devices G, H; while, as the solid matter of said ore pulp or slimes solution, etc., settles to the bottom of said settling chamber or compartment B and on to the conveyer-belt D traveling below the same, said settled solid matter is carried away by said belt D in an upward direction and out of—to a suitable point above the normal level of—the liquid. This said solid matter thus withdrawn (which I have found to contain about $22\frac{1}{2}\%$ moisture viz:—cyanid solution containing the values) is delivered into the settling chamber or compartment $B^1$ of a second apparatus (shown to the right of Figs. 2 and 3) which may advantageously be similar to the apparatus already described; this delivery being facilitated by washing this solid matter off the belt D into the chamber $B^1$ by means of the water supply or jets through the pipes K, K; in which second apparatus this solid matter is washed by means of any suitable amount of added wash water (say eight or ten times in quantity) and thereby the moisture or liquid (cyanid solution containing the values) carried over in and with the solid matter from the first apparatus is thus diluted. Clear liquid from this weakened cyanid solution in this second apparatus is drawn off (by suction) through the nozzles $H^1$ and the pipes $G^1$ as before, while the solid matter is caused or allowed to settle (rapidly) on the belt $D^1$ as before, and is carried out of the body of liquid and—if desired—deposited in turn in one or more further apparatus of a similar type and again washed and separated the operation being repeated as often as desired until sufficiently washed. In practice I have found three such apparatus acting in sequence, to be sufficient:—in the first apparatus the first deposition and separation of the solid matter is effected, and in the next two apparatus respectively the said solid matter is washed in succession and then redeposited and then carried out of the apparatus. After leaving the last depositing apparatus, the solid matter is then discharged finally in any suitable manner. I am thus able to use my invention as a continuous process by the aforesaid means.

Z is a baffle plate or partition extending partly across the chamber B (see Fig. 2) which may be used if required to further assist in keeping the liquid mass in the chamber B in a still or quiescent condition.

Referring now to Fig. 4; in this arrangement the belt D does not travel in a trunk such as the trunk C in Figs. 1 to 3; but on the contrary, the belt D travels along the sloping bottom of an open tank or vessel L which is filled to the desired level with the wet slimes or ore pulp; and, in this open vessel L, I arrange, toward the deep end, a sloping partition M which extends the whole width across the tank and extends close down to the belt D at or near its point of deepest immersion; and also, (if desired) I provide the end sloping partition O to guard the belt (which is returned over the outside of the tank) as it descends to the said lowest part of the tank; and I thus form a settling compartment or chamber toward the deepest end of the tank. The ore pulp, etc., is introduced into the settling tank vessel compartment or chamber; and, in all the arrangements illustrated the settling action takes place in said settling tank vessel compartment or chamber and is assisted by withdrawing constantly the solid matter as it settles on the belt D as the latter passes below the bottom opening of said settling compartment, etc.

Having thus described my invention, I claim as new and desire to secure by Letters Patent:

1. The herein described continuous process for separating liquid from solid matter in suspension in wet slimes or ore pulp; which consists in facilitating and assisting the said solid matter, suspended in such fluid mass, to settle in a settling vessel or compartment therein by constantly and steadily withdrawing such solid matter, as it settles, from the lower part of said vessel in close proximity below the point of discharge from the bottom of said settling vessel and delivering the said solid matter above the level of the fluid mass in said vessel and introducing the wet slimes or ore pulp into said vessel and withdrawing the clear liquid from said vessel in such a manner as to cause as little disturbance as possible to the whole fluid mass in said vessel substantially as and for the purposes hereinbefore described.

2. The herein described continuous process for separating liquid from solid matter in suspension in wet slimes or ore pulp; which consists in facilitating and assisting the said solid matter, suspended in such fluid mass, to settle in a settling vessel or compartment therein by constantly and steadily withdrawing such solid matter, as it settles, from the lower part of said vessel in close proximity below the point of discharge from the bottom of said settling vessel and delivering the said solid matter above the level of the fluid mass in said vessel and introducing the wet slimes or ore pulp into said vessel and withdrawing the clear liquid from said vessel in such a manner as to cause as little disturbance as possible to the whole fluid mass in said vessel and introducing the wet slime or ore pulp into, and withdrawing the clear solution from, the settling chamber at a point or points as nearly as possible directly over the deepest available part of said settling chamber substantially as and for the purposes hereinbefore described.

3. The herein described continuous process for separating liquid from solid matter in suspension in wet slimes or ore pulp, which consists in facilitating and assisting the said solid matter, suspended in such fluid mass to settle in a settling vessel or compartment therein by constantly and steadily withdrawing such solid matter, as it settles, from the lower part of said vessel in close proximity below the point of discharge from the bottom of said settling vessel and delivering the said solid matter above the level of the fluid mass in said vessel and introducing the wet slimes or ore pulp into said vessel and withdrawing the clear liquid from said vessel in such a manner as to cause as little disturbance as possible to the whole fluid mass in said vessel and withdrawing the clear solution from the settling chamber at a point or points as close as possible to the point or points at which the wet slime or ore pulp supply enters said settling chamber substantially as and for the purposes herein described.

4. The herein described continuous process for separating liquid from solid matter in suspension in wet slimes or ore pulp; which consists in facilitating and assisting the said solid matter, suspended in such fluid mass, to settle in a settling vessel or compartment therein by constantly and steadily withdrawing such solid matter as it settles, from the lower part of said vessel in close proximity below the point of discharge from the bottom of said settling vessel and delivering the said solid matter above the level of the fluid mass in said vessel and introducing the wet slimes or ore pulp into said vessel and withdrawing the clear liquid from said vessel in such a manner as to cause as little disturbance as possible to the whole fluid mass in said vessel and agglomerating the solid matter on the filtering surface of a suction filtering device or devices by applying suction to the latter, and alternately—and at rapid intervals—applying pressure through said filtering surface to thereby intermittently force the agglomerated or partly agglomerated solids off the surface of the filter and thereby cause or assist said solids to settle rapidly, substantially in the manner and for the purpose herein described.

5. The herein described continuous process for separating liquid from solid matter in suspension in wet slimes or ore pulp; which consists in facilitating and assisting the said solid matter, suspended in such fluid mass, to settle in a settling vessel or compartment therein by constantly and steadily withdrawing such solid matter, as it settles, from the lower part of said vessel in close proximity below the point of discharge from the bottom of said settling vessel and delivering the said solid matter above the level of the fluid mass in said vessel and introducing the wet slimes or ore pulp into said vessel and withdrawing the clear liquid from said vessel in such a manner as to cause as little disturbance as possible to the whole fluid mass in said vessel and introducing the wet slime or ore pulp into, and withdrawing the clear solution from, the settling chamber at a point or points as nearly as possible directly over the deepest available part of said settling chamber; and agglomerating the solid matter on the filtering surface of a suction filtering device or devices by applying suction to the latter, and alternately—and at rapid intervals—applying pressure through said filtering surface to thereby intermittently force the agglomerated or partly agglomerated solids off the surface of the filter and thereby cause or assist said solids to settle rapidly substantially as and for the purposes herein described.

6. The herein described continuous process for separating liquid from solid matter in suspension in wet slimes or ore pulp, which consists in facilitating and assisting the said solid matter, suspended in such fluid mass, to settle in a settling vessel or compartment therein by constantly and steadily withdrawing such solid matter, as it settles, from the lower part of said vessel in close proximity below the point of discharge from the bottom of said settling vessel and delivering the said solid matter above the level of the fluid mass in said vessel and introducing the wet slimes or ore pulp into said vessel and withdrawing the clear liquid from said vessel in such a manner as to cause as little disturbance as possible to the whole fluid mass in said vessel and withdrawing the clear solution from the settling chamber at a point or points as close as possible to the point or points at which the wet slime or ore pulp supply enters said settling chamber, and agglomerating the solid matter on the filtering surface of a suction filtering device or devices by applying suction to the latter, and alternately— and at rapid intervals—applying pressure through said filtering surface to thereby intermittently force the agglomerated or partly agglomerated solids off the surface of the filter and thereby cause or assist such solids to settle rapidly substantially as and for the purposes described.

In witness whereof I have hereunto set my hand in the presence of two witnesses.

HORACE GEORGE NICHOLS.

Witnesses:
H. D. JAMESON,
F. L. RAND.